Nov. 3, 1959 D. CHARLES ET AL 2,911,556

BACKWARD TRAVELLING WAVE OSCILLATORS

Filed March 21, 1955 2 Sheets-Sheet 1

Nov. 3, 1959 D. CHARLES ET AL 2,911,556

BACKWARD TRAVELLING WAVE OSCILLATORS

Filed March 21, 1955 2 Sheets-Sheet 2

2,911,556

BACKWARD TRAVELLING WAVE OSCILLATORS

Daniel Charles and Bernard Epsztein, Paris, France, assignors to Compagnie Generale de Telegraphie Sans Fil, a corporation of France Application March 21, 1955, Serial No. 495,584
Claims priority, application France March 25, 1954
4 Claims. (Cl. 315—3.6)

Backward travelling wave oscillators having a wide electronic tuning band are known in which use is made of the energy transfer from an electron beam to a wave propagated in a delay line of periodic structure, by interaction between this beam and a negative space harmonic, i.e. a space harmonic having a phase velocity of a sign opposite to that of the group velocity of the wave. It is known that for a sufficient beam current, oscillations are set up and sustained in such oscillators.

Such an oscillator was described in the copending application Serial No. 281,347, filed in the name of Bernard Epsztein on April 9, 1952, and now Patent No. 2,880,355.

As described in that application, the frequency of oscillation may be controlled in this oscillator by controlling the direct current voltage applied between the cathode and the delay line. The higher the frequency to be obtained, the higher must be the direct current voltage. The result is that the direct current power applied to the tube, which is proportional to this voltage, is very variable from one limit of the frequency band of the output oscillations to the other. The ultra-high frequency output power is, in consequence, itself very variable. This variation may attain ratio of the order of 10:1, which may be undesirable in certain applications of the oscillator.

The present invention relates to an oscillator of the aforementioned type in which the power is substantially constant throughout the whole frequency band of the output oscillations.

The backward travelling wave oscillator, according to the invention, comprises essentially a tube having two electron sources positioned for propagating two beams in opposite directions for interaction with a wave travelling in a delay line of periodic structure. The respective velocities of the beams are such that one of them interacts with a negative space harmonic component of the electromagnetic field propagated in the delay line, i.e. a space harmonic having a phase velocity of a sign opposite to the sign of the group velocity, of the wave energy propagating in the line, whereas the other beam interacts with a forward or positive space harmonic component i.e. a space harmonic having a phase velocity of the same sign as the group velocity.

Thus, the oscillator according to the invention comprises a first system built up essentially from the first electron source and the delay line, and a second system built up essentially from the second electron source and the same delay line. Both systems have a common output. The first system acts as a backward wave oscillator system such as described in the above mentioned copending patent application. As pointed out above, the power output of this oscillator system increases when the output frequency is increased, and decreases when the output frequency is decreased. The second system acts as a conventional travelling wave amplifier system which amplifies the output of the oscillator system. It is known that the gain of this amplifier system varies in inverse ratio to the output frequency. Therefore, the output power of the whole tube according to the invention is substantially independent of the output frequency.

The invention will be better understood from the ensuing description taken in connection with the accompanying drawing which illustrates some non-limiting embodiments thereof.

Figs. 1 and 2 show respectively a longitudinal and a cross sectional view of a first embodiment of the tube according to the invention;

Figs. 3*a* and 3*b* show the dispersion curves of the delay line;

Figures 1, 2, 3A, 3B, 4:
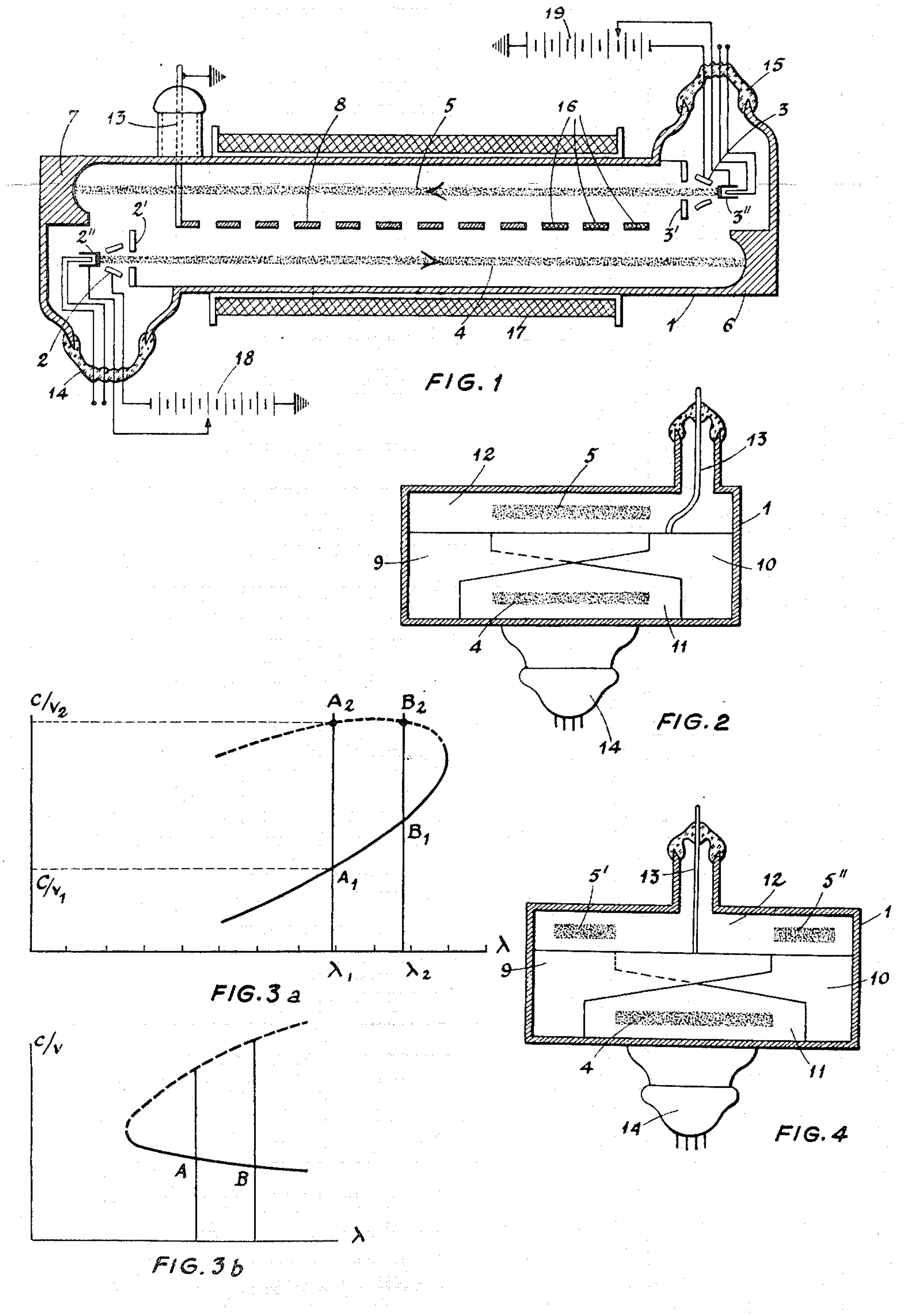
Fig. 4 shows a cross sectional view of a second embodiment of the tube in accordance with the invention.

According to the embodiment shown in Fig. 1, the tube comprises a metallic envelope 1, and two electron guns 2 and 3 positioned to provide two parallel electron beams 4 and 5 in opposite directions. The electrons are caught at the end of their travel by the collectors 6 and 7 respectively. A delay line, for instance the interdigital line 8 comprising fingers 9 and 10, fixed respectively to the lateral walls of the envelope 1, defines respectively with the upper and lower faces of the latter, two spaces 11 and 12 in which the beams 4 and 5 are respectively propagated. Adjacent the gun 2, the delay line 8 is provided with an output, for instance the coaxial output 13, placed laterally on the envelope so as not to interfere with the passage of the beam 5. Absorbing means 16, constituted for instance by a lossy material such as aquadag, is disposed over the end portion of the delay line 8, for absorbing, within the desired broad band, wave components having group velocity directed in the sense of the beam 4, such for instance as the reflections caused by a possible mismatch of the load connected to the output 13. The envelope 1, the collectors 6 and 7, the delay line 8 and the accelerating anodes 2' and 3' of the guns 2 and 3, may be grounded, the other electrodes of the guns being then brought to appropriate negative potentials respectively by the connections extending through glass sockets 14 and 15 to respective supply sources 18 and 19. In the embodiment shown, a coil 17 creates a longitudinal focusing magnetic field as is well known in the art.

For a better understanding of the operation of this tube, it may be helpful first to consider Fig. 3*a* which shows the dispersion curve of the ultra-high frequency energy propagated in the delay line 8 in the vicinity of its longitudinal plane of symmetry. As is well known, a dispersion curve shows the ratio between the velocity of light $c$ and the phase velocity $v$ of the various space harmonics, or wave components, of the ultra-high frequency energy as a function of the wavelength $\lambda$ of the output energy in free space. It is known that such curves comprise a succession of branches alternately corresponding to negative and positive space harmonics, i.e. wave components propagating respectively in a direction opposite to that of the energy flow in the delay line. In the case of the longitudinal symmetry plane of an interdigital line used in this case, the first branch $A_1B_1$ shown in full line corresponds to the fundamental which is negative, and the second branch $A_2B_2$, shown in dotted line, corresponds to the first space harmonic which is positive.

The operation of the tube according to the invention is the following:

The cathode 2'' of the gun 2 is brought, by the source 18, to a negative potential relative to the accelerating anode 2' of the same gun, such that the velocity of the beam 4 is made equal to the phase velocity $v_1$ of a negative space harmonic, for instance the fundamental corresponding to the full line branch $A_1B_1$ of Fig. 3*a*. When the current of the beam 4 is of sufficient value, oscillations having a wavelength $\lambda_1$ which corresponds to said valve of $$\frac{c}{v_1}$$

appear in the delay line 8 as described in the above mentioned copending application. The frequency of the output energy collected at the output 13 is regulated by the potential of the source 18.

Further, the cathode 3″ of the gun 3 is brought, by means of the source 19, to such a negative potential relative to the accelerating anode 3′ of this gun, that the beam 5 propagates with a velocity equal to the phase velocity $v_2$ of a positive space harmonic of the wave generated on the delay line, for instance the first space harmonic corresponding to the branch $A_2B_2$, shown in dotted line, in Fig. 3*a*. Thus if the wavelength of the energy collected at the output 13 is $\lambda_1$, the velocity of the beam 5 must be $v_2$. The interaction of the beam 5 with the wave travelling in the delay line 8 gives rise to amplification, in the same way as in any conventional travelling wave amplifier.

It may be seen from Fig. 3*a* that, if it is desired that the output frequency vary, the output wavelength varying for instance from $\lambda_1$ to $\lambda_2$, the velocity of the beam and, accordingly, the voltage applied between the accelerating anode 2′ and the cathode 2″ must vary substantially.

Therefore, if there were no beam 5; the output power of the oscillator system comprising the delay line 8 and the gun 2 would be an increasing function of the output frequency.

Now, it is well known that in a travelling wave amplifier, such as that formed by the gun 3 and the delay line 8, the gain per unit length diminishes when the frequency increases.

These two effects compensate one another and experiments have shown that the output power of the tube becomes substantially independent of the frequency.

It will be noted that the dotted line branch shown in Fig. 3*a* hardly deviates from a horizontal straight line. This shows that with a delay line of the type having dispersion characteristics as shown, the corresponding space harmonic propagates in the line with a phase velocity $v_2$ substantially independent of the output frequency. Accordingly, the velocity of the beam 5 and consequently the voltage to be applied between the accelerating anode 3′ and the cathode 3″ may be substantially constant and determined once for all.

The invention is of course not limited to the embodiment shown in Figs. 1 and 2. Thus a delay line other than an interdigital one could be used in the tube according to the invention. Furthermore, the interdigital line may be utilized in different ways from that described.

In the copending application Serial No. 275,928 filed by R. Warnecke on March 11, 1952, the propagation of the ultra-high frequency field in delay lines of the interdigital type is examined.

It has been demonstrated that in any plane of longitudinal section of an interdigital delay line parallel to the plane of symmetry and sufficiently remote from this plane, the dispersion curve assumes the shape shown in Fig. 3*b*. The wave which is propagated in these planes comprises a positive fundamental component whose phase velocity has the same sign as the group velocity of the ultra-high frequency energy, and a negative first harmonic.

Fig. 4 shows a cross-sectional view of another tube embodying the invention in which this property is utilized. Like reference numerals designate like elements in Figs. 2 and 4. The beam 4 interacts with the fundamental component propagated in the central zone of the delay line 8 according to the dispersion characteristic shown in full line in Fig. 3*a*; the beam 5 is replaced by two laminar beams 5′ and 5″ which are situated outside the plane of symmetry of the line and are, therefore, in interaction with waves propagating according to dispersion characteristics of Fig. 3*b*. The velocities of these beams are adjusted to be in interaction with fundamental components prevailing in these lateral zones of the line 8, i.e. with components having phase velocities and group velocities of the same sign. The ultra-high frequency output 13 is in the longitudinal plane of symmetry of the tube where it does not interfere with the beams 5′ and 5″. These beams are emitted by two guns which may have the same longitudinal section as the gun 3 shown in Fig. 1.

The operation of this tube is similar to that of the preceding tube. The oscillator part of the tube comprises the delay line 8 and the beam 4. The amplifier part of the tube comprises the delay line 8 and beams 5′ and 5″.

The invention is not limited to the tubes having a longitudinal focusing magnetic field provided by the coil 17 as described above. It is for instance equally applicable to tubes of the magnetron type, i.e. having crossed transverse electric and magnetic fields.

Figure 5:
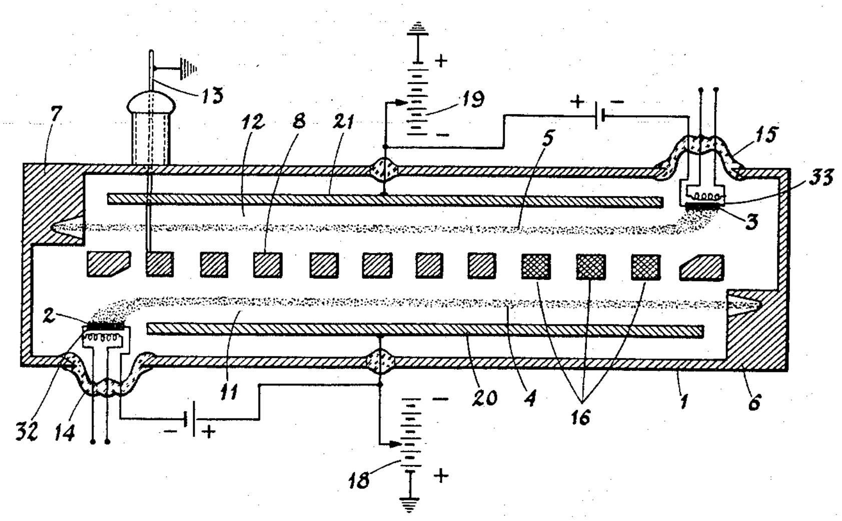
Fig. 5 shows a longitudinal cross sectional view of a tube according to the invention, having crossed electric and magnetic fields.
Figure 6:
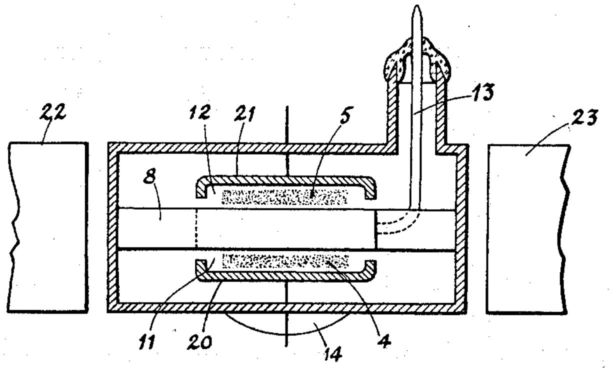
Fig. 6 shows a transverse cross-section of the tube of Fig. 5.

Such a tube is shown in Figs. 5 and 6 wherein same reference numerals have been used for designating the same elements as in the previous figures.

The tube shown in Figs. 5 and 6 differs from the tube shown in Figs. 1 and 2 only by the absence of the focusing coil 17 and the presence of the two negative electrodes 20 and 21 which are parallel to the delay line 8, and are respectively located on both sides of the latter. The voltages provided respectively by the sources 18 and 19 are applied between the delay line 8 and the electrodes 20 and 21 respectively. The latter electrodes 20 and 21 are negative with respect to the delay line 8. A transverse magnetic field is provided in both spaces 11 and 12 bounded by the delay line 8 and the electrodes 20 and 21 respectively, by means of poles 22 and 23 shown in Fig. 6. The beam 4 provided by the cathode 32 propagates in the space 11 bounded by the electrode 20 and the delay line 8, in a direction normal to the crossed electric and magnetic fields prevailing in the above space. The beam 5 provided by the cathode 33 propagates in the same way in the space or bounded by the electrode 21 and the delay line 8.

The operation of the tube shown in Figs. 5 and 6 is exactly the same as the operation of the tubes of the previous figures.

What we claim is:

1. An ultra-high frequency oscillator tube adapted to produce oscillations of a frequency which is adjustable at will over a relatively wide uninterrupted band, said tube comprising a delay line having a geometrically periodical structure and having its two ends mutually uncoupled; a first and a second electron emissive means adjacent respectively the two ends of said line and positioned to emit respectively a first beam of electrons and a second beam of electrons parallel to and separate from the first beam in coupled relationship with said line for induction of electromagnetic wave energy therein and for respective interaction between each of said electron beams and a different space harmonic of electromagnetic wave energy in said line; said second beam having at least one section; means respectively adjacent the two ends of said line for collecting the electrons of said beams; means disposed in the electric field of said line at its end portion remote from said first emissive means for absorbing ultra-high frequency energy propagated along said line in the same direction as said first beam; means for directing said beams of electrons along paths substantially parallel to said line, the velocity of said first beam of electrons being substantially equal to the apparent or phase velocity of a negative space harmonic of said electromagnetic wave energy propagating in said line in the opposite direction to said first beam, thereby to cause induction of said energy and interaction between said first beam and said negative space harmonic for sustained flow of energy toward said first electron emissive means, the velocity of said second beam being substantially equal to the apparent or phase velocity of a positive space harmonic of said electromagnetic energy for amplifying the latter; and output means, positioned at the same end of the tube as said first electron emissive means, for transferring said energy to an external load circuit.

2. A microwave oscillator tube comprising a wave energy transmission delay line having a first and a second end; electron emissive means located at said first end for producing a first electron beam inducing in said transmission delay line ultra high frequency oscillatory energy flowing in a direction opposite to that of the direction of flow of said first beam, output means coupled to said first end for transferring said energy from said delay line to an external load, absorbing means near said second end for absorbing energy flowing in said delay line towards said second end; electron emissive means located at said second end for producing a second electron beam in the same direction as said oscillatory energy and in coupled relationship therewith, said first and second beam being separated from one another by said delay line, and means for controlling the velocities of said first and second beams respectively in synchronism with a negative and a positive component of said oscillatory energy.

3. An oscillator as claimed in claim 2, comprising means for coupling both said beams with the portion of said delay line symmetrical with respect to the longitudinal symmetry plane thereof and adjacent thereto, said output means being offset with respect to said longitudinal symmetry plane.

4. An oscillator as claimed in claim 2, comprising a delay line of interdigital structure, means for coupling said first beam with the portion of said line symmetrical with respect to the longitudinal symmetry plane thereof and adjacent thereto, said second electron emissive means comprising two electron sources positioned for emitting separate electron beams respectively in coupled relationship with lateral portions of said line parallel to said symmetry plane, said output means being positioned substantially in said longitudinal symmetry plane.

References Cited in the file of this patent

UNITED STATES PATENTS

| | | |
|---|---|---|
| 2,406,370 | Hansen et al. | Aug. 27, 1946 |
| 2,479,084 | Rosenthal | Aug. 16, 1949 |
| 2,702,370 | Lerbs | Feb. 15, 1955 |
| 2,757,311 | Huber et al. | July 31, 1956 |
| 2,820,170 | Robertson | Jan. 14, 1958 |
| 2,830,271 | Pierce | Apr. 8, 1958 |

FOREIGN PATENTS

| | | |
|---|---|---|
| 699,893 | Great Britain | Nov. 18, 1953 |